United States Patent
Chen et al.

(10) Patent No.: US 9,727,348 B2
(45) Date of Patent: Aug. 8, 2017

(54) PROVIDING A CONTEXT-AWARE HELP CONTENT USING A TRANSPARENT OVERLAY ON A TOUCH SENSITIVE SCREEN

(75) Inventors: Sean Y H Chen, Taipei (TW); Jeffrey C H Liu, Taipei (TW); Joey H Y Tseng, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1154 days.

(21) Appl. No.: 13/097,395

(22) Filed: Apr. 29, 2011

(65) Prior Publication Data

US 2011/0271185 A1    Nov. 3, 2011

(30) Foreign Application Priority Data

Apr. 30, 2010   (TW) ................. 99114016 A (51) Int. Cl.
*G06F 3/00* (2006.01)
*G06F 9/44* (2006.01)
(Continued)

(52) U.S. Cl.
CPC .......... *G06F 9/4446* (2013.01); *G06F 3/0481* (2013.01); *G06F 9/4443* (2013.01); *G06F 3/0482* (2013.01); *G06F 3/04842* (2013.01); *G06Q 10/10* (2013.01); *G06Q 30/02* (2013.01); *H04M 1/72522* (2013.01); *H04M 2250/22* (2013.01); *H04M 2250/56* (2013.01)

(58) Field of Classification Search
CPC .... G06F 9/4446; G06F 3/0481; G06F 3/0482; G06F 9/4443; G06F 3/04842; G06Q 10/10; G06Q 30/02

USPC ........ 715/705, 708, 709, 712, 714, 715, 768
See application file for complete search history.

(56) References Cited

U.S. PATENT DOCUMENTS 5,287,448 A * 2/1994 Nicol et al. ............... 715/707
5,946,647 A * 8/1999 Miller et al. ............... 704/9
(Continued)

FOREIGN PATENT DOCUMENTS

JP    2001084072    3/2001
JP    2002316466    10/2002
(Continued)

OTHER PUBLICATIONS

U.S. Appl. No. 61/185,839, filed Jun. 10, 2009.*
(Continued)

*Primary Examiner* — Tuyetlien T Tran
(74) *Attorney, Agent, or Firm* — Patents on Demand P.A.; Brian K. Buchheit; Scott M. Garrett (57) ABSTRACT

Objects shown on a display interface can be collected for a running application. Identifications (IDs) representing the objects can also be collected. A determination can be made concerning whether there are object identifications of objects with help contents associated. A transparent layer can be displayed on the display interface. All the objects associated with help contents of the layer can be visually indicated in the transparent layer. The visual indicators can indicate that help is available for a corresponding object. When no help is available, no visual indicator is shown in the transparent layer proximate to corresponding object.

24 Claims, 5 Drawing Sheets

(51) Int. Cl.

| | | |
|---|---|---|
| *G06F 3/0481* | (2013.01) | |
| *G06F 3/0482* | (2013.01) | |
| *G06F 3/0484* | (2013.01) | |
| *G06Q 10/10* | (2012.01) | |
| *G06Q 30/02* | (2012.01) | |
| *H04M 1/725* | (2006.01) | |

(56) References Cited

U.S. PATENT DOCUMENTS

| | | | |
|---|---|---|---|
| 6,339,436 B1* | 1/2002 | Amro et al. | 715/714 |
| 6,452,607 B1 | 9/2002 | Livingston et al. | |
| 6,563,514 B1* | 5/2003 | Samar | 715/711 |
| 6,973,663 B1* | 12/2005 | Brown et al. | 725/39 |
| 7,516,405 B2 | 4/2009 | Burkhart et al. | |
| 7,921,370 B1* | 4/2011 | Legault | 715/762 |
| 8,042,045 B1* | 10/2011 | Sullivan et al. | 715/708 |
| 8,166,395 B2* | 4/2012 | Omi et al. | 715/709 |
| 2002/0036662 A1* | 3/2002 | Gauthier et al. | 345/835 |
| 2004/0044635 A1* | 3/2004 | Gordon et al. | 706/50 |
| 2004/0128227 A1* | 7/2004 | Kaiser | 709/227 |
| 2005/0085257 A1* | 4/2005 | Laird et al. | 455/550.1 |
| 2005/0154986 A1* | 7/2005 | Bartek et al. | 715/714 |
| 2005/0197852 A1* | 9/2005 | Gebhard et al. | 705/1 |
| 2005/0220439 A1* | 10/2005 | Carton et al. | 386/4 |
| 2005/0268234 A1* | 12/2005 | Rossi et al. | 715/705 |
| 2006/0010381 A1* | 1/2006 | Molander et al. | 715/707 |
| 2006/0173816 A1 | 8/2006 | Jung et al. | |
| 2007/0061722 A1 | 3/2007 | Kronlund et al. | |
| 2007/0061723 A1* | 3/2007 | Ohga et al. | 715/705 |
| 2007/0101288 A1* | 5/2007 | Forstall et al. | 715/781 |
| 2007/0122789 A1* | 5/2007 | Yoo | 434/323 |
| 2007/0220428 A1 | 9/2007 | Kureshy et al. | |
| 2007/0220429 A1 | 9/2007 | Kureshy et al. | |
| 2007/0298385 A1* | 12/2007 | Jenkins et al. | 434/156 |
| 2008/0052622 A1* | 2/2008 | Yajima et al. | 715/709 |
| 2008/0201667 A1 | 8/2008 | Drayer et al. | |
| 2008/0228315 A1* | 9/2008 | Wendner et al. | 700/180 |
| 2008/0280588 A1* | 11/2008 | Roundtree et al. | 455/405 |
| 2008/0294549 A1* | 11/2008 | Leader | 705/39 |
| 2008/0301558 A1 | 12/2008 | Najafi et al. | |
| 2008/0306946 A1* | 12/2008 | Wu | 707/6 |
| 2009/0006956 A1* | 1/2009 | Bae et al. | 715/708 |
| 2009/0204928 A1 | 8/2009 | Kallio et al. | |
| 2009/0271704 A1 | 10/2009 | Cohen | |
| 2009/0300494 A1* | 12/2009 | Cottingham et al. | 715/708 |
| 2010/0167788 A1* | 7/2010 | Choi | 455/566 |
| 2010/0192097 A1* | 7/2010 | Brugler et al. | 715/821 |
| 2011/0225494 A1* | 9/2011 | Shmuylovich et al. | 715/705 |

FOREIGN PATENT DOCUMENTS

| | | | |
|---|---|---|---|
| JP | 2005339560 A | 8/2005 | |
| JP | 2005293248 | 10/2005 | |
| JP | 2008115194 | 5/2008 | |
| JP | 2008115196 | 5/2008 | |
| JP | 2009244841 | 10/2009 | |
| JP | 2011238220 | 11/2011 | |
| TW | 200736892 | 10/2007 | |
| TW | 201001272 A | 1/2010 | |
| TW | 201009688 A | 3/2010 | |
| TW | 201137725 A | 1/2011 | |
| WO | 2009114285 A1 | 9/2009 | |
| WO | WO 2010/141748 A1 * | 12/2010 | G06F 3/048 |

OTHER PUBLICATIONS

Leung et al. "The Learnability of Mobile Application Interfaces Needs Improvement" Department of Computer Science, Department of Psychology; University of British Columbia; pp. 1-2.

* cited by examiner

PROVIDING A CONTEXT-AWARE HELP CONTENT USING A TRANSPARENT OVERLAY ON A TOUCH SENSITIVE SCREEN

CROSS REFERENCE TO RELATED APPLICATIONS

This application claims priority of Taiwan Patent Application Serial No. 99114016 entitled "Method, Device and Computer Program Product for Providing a Context-Aware Help Content", filed on Apr. 30, 2010.

BACKGROUND

The disclosure relates generally to mobile devices, software, and more particularly to context-aware help content.

Mobile devices, such as mobile phones, PDAs, computing tablets, GPS systems, and any pervasive device, have continuously increased in popularity and power. This increased power has led to an increase in functionality and a corresponding increase in complexity. This increase in complexity has resulted in a significant learning curve, which poses as a barrier for taking advantage of features of the mobile devices.

For example, in addition to traditional voice communication, many mobile devices provide a variety of applications to users which enable Internet use. Conventionally implemented help features and techniques are geared towards personal computers. These personal computers have significantly larger screen size, a variety of interface peripherals, and the like, which are not available to a mobile device. Thus, attempts to port existing techniques have largely failed, to one extent or another—primarily due to these techniques being cumbersome to use from a user experience perspective and being resource hungry in the mobile device context.

BRIEF SUMMARY

One embodiment discloses a method, a computer program product, and/or a data processing system for providing a context-aware help content. The method comprises the following steps: collecting objects (e.g. components) shown on a display interface for a running application and identifications (IDs) representing the objects; determining whether there are object identifications of objects with help contents associated; and displaying a transparent layer over the display interface and highlighting all the objects with help contents associated on the layer to prompt a user to select a desired object. The present invention also discloses that when an object is selected by a user, the content of the object will be displayed directly on the layer, beside the object and over the display interface.

Another embodiment discloses a method, a computer program product, and/or a data processing system for presenting a set of graphical objects on a touch-sensitive screen. A graphical overlay can be presented on the touch-sensitive screen. The graphical overlay can have a level of transparency that permits the graphical objects to be seen through the graphical overlay. The graphical overlay can present a help indictor proximate to the graphical objects for which help content is available. No help indicator is presented on the graphical overlay proximate to graphical objects to which help content is not available. A touch input can be received on the touch-sensitive screen for one of the help indicators and a corresponding one of the graphical objects is still visible through the graphical overlay. Responsive to the touch input, help content can be determined for the one of the graphical objects. The help content can be presented on the touch-sensitive screen in responsive to receiving the touch input.

DETAILED DESCRIPTION

Several techniques exist to provide the help features for applications running on a mobile device. All of these known techniques have significant shortcomings. For example, one technique is to provide a reference document to a user, where the reference document provides help content. The reference document can be provided within a locally running application or through an external Website. In a mobile device (e.g., a handheld device) context, however, use of a reference document requires a user to switch contexts and to traverse the document to find a specific help document that the user desires. This is troublesome from a handheld device, which has a very limited display region. This technique can also consume substantial resources, resulting in poor performance and weak response time from the mobile device.

Another conventional approach is to put an embedded assistance proximate to content elements that might require further explanation. For example, a question mark icon can be provided beside a component for which explanations are available. This technique can consume screen space of a limited GUI, can result in a cluttered layout, and can increase a number of user-selectable targets thereby increasing user input mistakes. Generally, this technique when applied to a mobile device often results in a reduction in a user's satisfaction with the user interface.

Still another technique is to associate an embedded help feature without any icons or indicators appearing on the display. This permits users to click/touch the component in a characteristic manner, which results in a help message being responsively presented. With this technique, however, users often are not aware of what elements have help associated with them and what elements don't. Worse, user interface elements and selection mechanisms are often functionally overloaded, so a user attempting to activate help for an element often inadvertently triggers other device functions or simply does nothing. Both situations are highly frustrating to end-users. These problems were evaluated, analyzed, and investigated during the course of developing the solutions of the disclosure.

An embodiment of the disclosure provides a help mode for displaying a transparent layer over an existing display interface. The help mode can be triggered in a system/user defined way. After a mobile device enters the help mode by a user, a transparent layer can cover the display interface. The components shown on the display interface having associated help contents can be highlighted on the layer in a dynamic fashion for prompting the user to select a desired component (i.e. target component). Use of other visual indicia (in substitution or in addition to highlighting) is also contemplated. The location of each UI component can depend on the layout design of the display interface of a running and displayed application, and thus does not need a predetermined location. Basically, the display interface of each application will have a different layout of components, also called a different context.

Once a component is selected by the user, the help contents will be displayed directly on the transparent layer, beside the target component, and over the original UI. After the user exits from the help mode, the transparent layer withdraws and the user is back to the original UI. As disclosed in the present invention to dynamically highlight the components with help contents associated according to the context of an application, it provides a context-aware help feature on a mobile device.

Thus, the present disclosure provides a help mode. As the help contents are directly shown beside the component selected by a user, the user needs not to leave the current application/tab and traverse through help document to find specific topics. No context switch is needed for the help contents. Thus, an intuitive and efficient mechanism is accomplished for help features according to the present invention. Next, the help mode according to the present invention does not take up any space on the original UI. A developer has no effort of designing where and how to put the help icons and help content on the layout, as these are placed on the transparent layer by default. Accordingly, the help features according to the disclosure may maintain a concise UI. Finally, as the components having help contents are highlighted on a transparent layer in a dynamic fashion, users don't have to use advanced operations such as touch, hold or hover etc. Thus, the solution according to the present invention provides an ease-of-use mechanism for help features.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
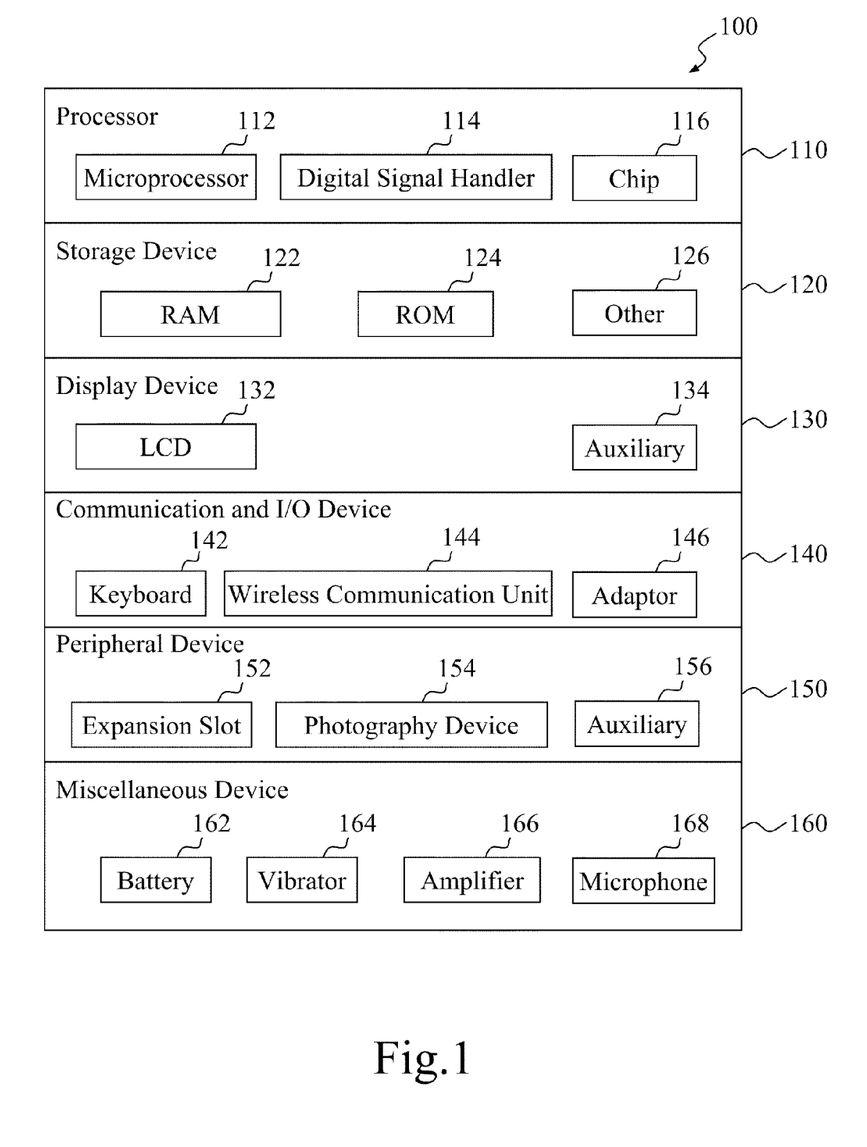
FIG. 1 is an exemplary diagram of a mobile device having a touch-sensitive screen according to one embodiment of the present invention.

FIG. 1 is an exemplary diagram of a mobile device having a touch-sensitive screen according to one embodiment of the disclosure. In this exemplary embodiment, mobile device 100 is a portable electronic product, such as mobile phone, PDA (personal digital assistant), GPS (global position system) device, media player, etc., capable of executing application programs for providing at least one of the following services: Internet, multimedia, document editing or other applications.

In FIG. 1, a mobile device 100 is illustrated for exemplary purpose rather than limitation so that those skilled in the art may understand an embodiment of the present invention. Mobile device 100 has a processor 110, storage device 120, display device 130, communication and input/output device 140, peripheral device 150, miscellaneous device 160, and the like. Derivate and variations of device 100 are also contemplated and to be considered within scope of the disclosure.

In one embodiment, the processor 110 may be a general purpose processing unit or a special purpose processing unit for handling analog/digital signal or executing program codes for providing specific function, such as microprocessor 112, digital signal handler 114, and other chips 116.

The storage device 120 may includes random access memory (RAM) 122 and read-only memory (ROM) 124 for storing program codes or other data to be accessible to the handheld device 100. The storage device 120 may have other storage unit 126 for accessing and/or storing additional data, such as card reader, memory card, external disk arrays.

The display device 130 may have LCD monitor 132 for displaying to the user the interface or other information of the operating system or the result of the executed application program. The display device 130 may have an auxiliary display unit 134 for providing other indication or information to the user, such as an LED light or the likes.

The communication and input/output device 140 may include a keyboard 142, a wireless communication unit 144 and adaptor 146. The keyboard 142 may be used as an input device for inputting instructions and/or data by the user, such as a digit pad, a QWERTY keypad, or other keyboard. In addition, the keyboard 142 may have other additional component, such as function keys, arrow keys, switches, radio buttons, knobs, joysticks, buttons or other elements for inputting data. The wireless communication unit 144 may be used to wirelessly transfer data, such as digital data transmission or voice data transmission to the base station by means of any kind of protocols, such as GSM, CDMA, SMS, MMS, WIFI, Bluetooth, IrDa (Infrared Data Association), etc. The adaptor 146 may provide a connection to external devices for transmitting data, such as IEEE 1394, USB or other adaptors The peripheral device 150 may have extra an expansion slot 152 for providing addition functions; a photography device 154 for picture or video capturing; and other auxiliary component 156, such as a barcode scanner, RFID unit, etc.

The miscellaneous device 160 may include other components, such as battery 162, vibrating element 164, amplifier 166, microphone 168, etc.

Figure 2A:
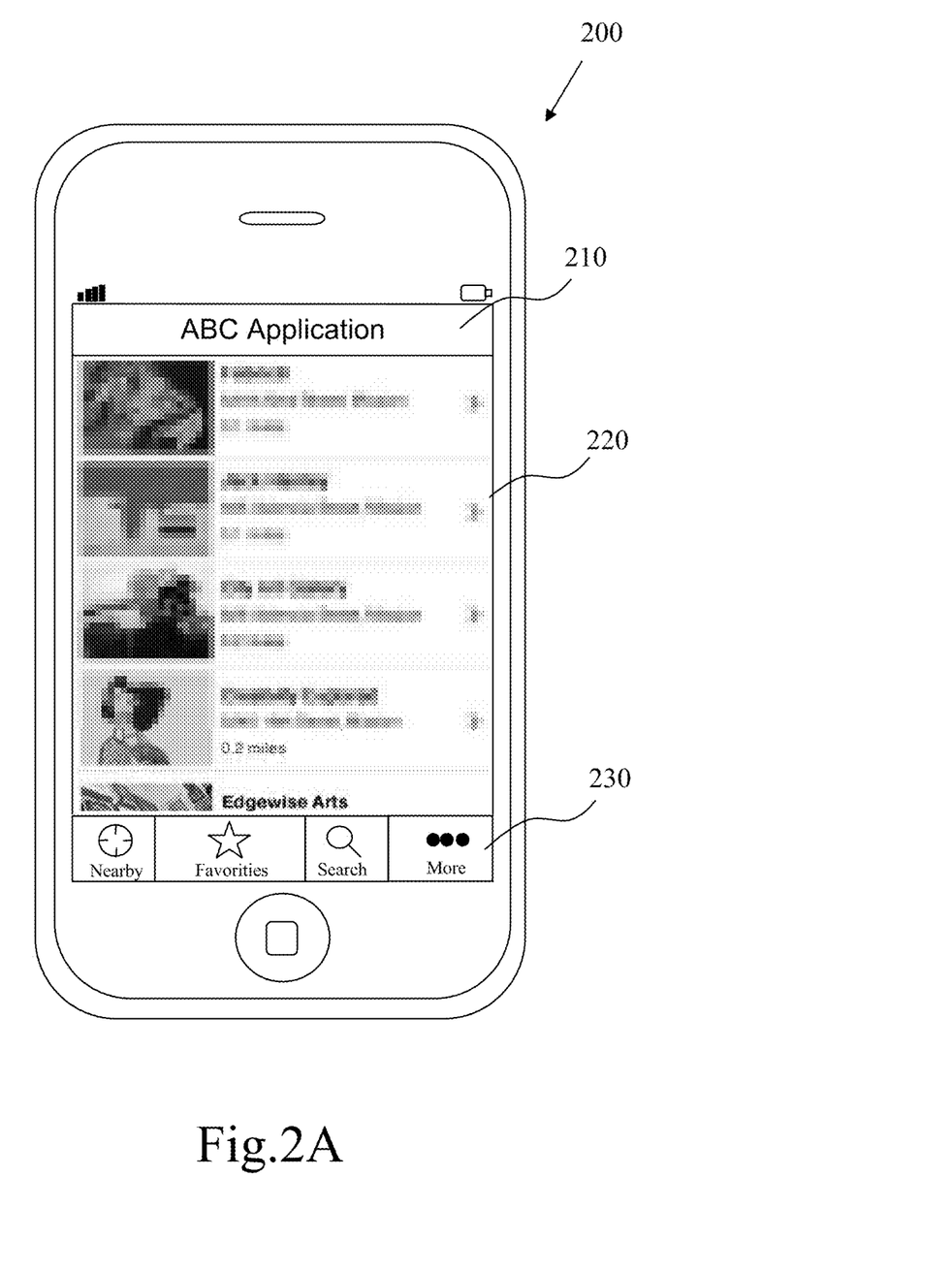
FIG. 2A, FIG. 2B, and FIG. 2C show different exemplary screen displays of a display interface on a mobile device in accordance with one embodiment of the disclosure.
Figure 2B:
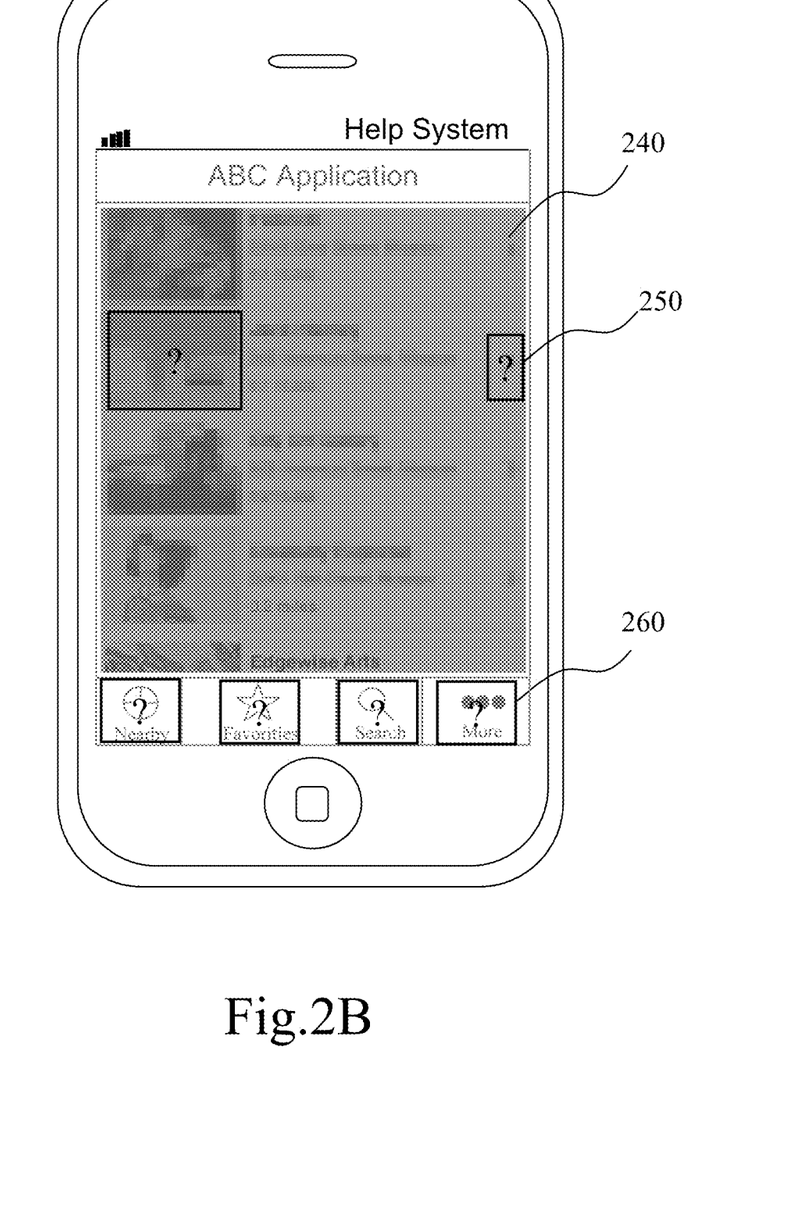
Figure 2C:
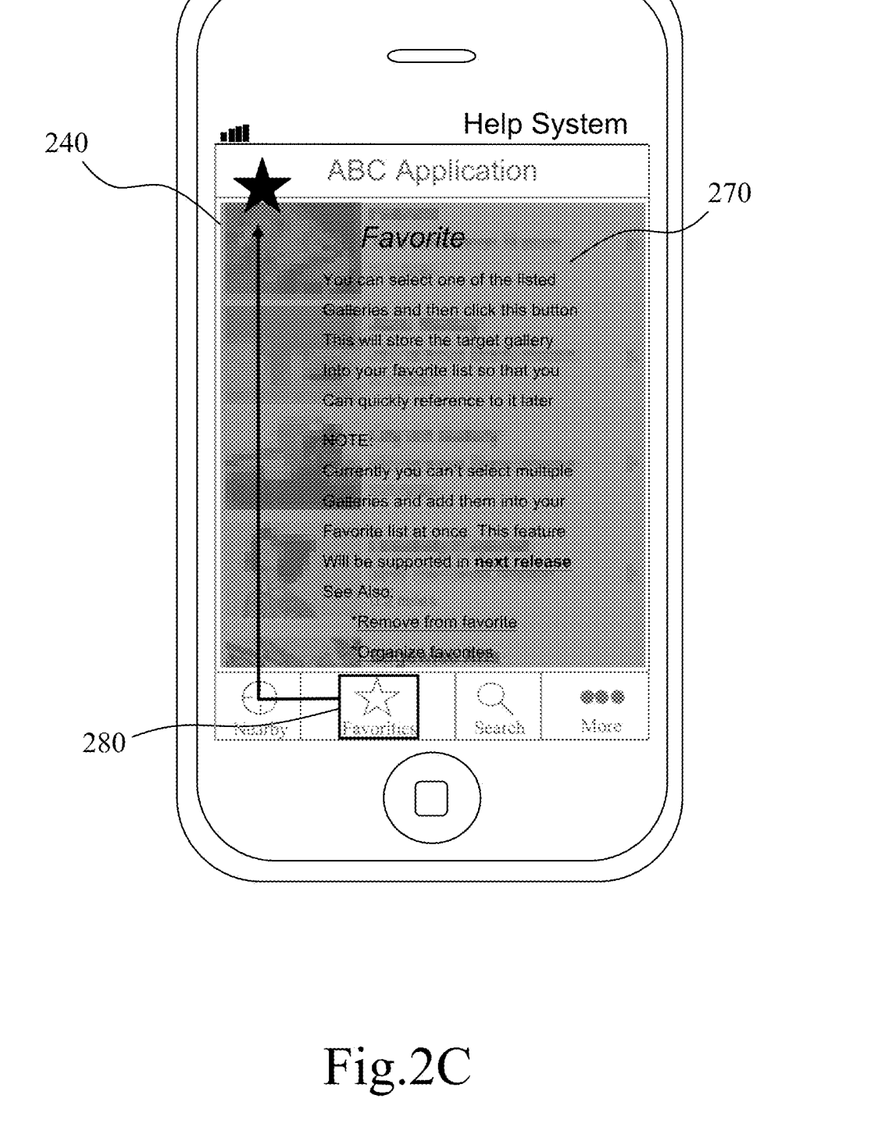

FIGS. 2A to 2C show different exemplary screen displays of a display interface on a mobile communication device in accordance with one embodiment of the present invention. FIG. 2A shows a layout on an original display interface of a ABC application 210 which is running on the mobile device 200 includes a plurality of components (i.e. UI components), such as a plurality of "is greater than" symbols (">") 220 and a plurality of buttons 230.

When the user of the mobile device 200 is using the ABC application 210 and is wondering what the component "Favorites" button (the one with a star sign shown in a lower position of FIG. 2A) is for? The user can trigger the context-aware help feature on the mobile device and enter a help mode by using voice-over commands or any other mechanisms (e.g. clicking a specific key). After entering the help mode, a transparent layer 240 will be displayed over the display interface.

As shown FIG. 2B, the UI components with help contents associated (e.g. the plurality of rectangle boxes including question marks 250, 260 shown in FIG. 2B) will be dynamically highlighted on the transparent layer 240 to prompt the user to select a target component for usage explanation or further description. The location of each UI component depends on the layout design of the display interface of an application, and thus does not need a predetermined location. Basically, the display interface of each application will have a different layout of components, also called a different context. As the components with help contents associated are dynamically highlighted according to a layout design on a display interface of an application, the present invention provides a context-aware help feature on a mobile device.

Referring now to FIG. 2C, when the user selects a component such as the button 280 with a star sign shown in a lower position of FIG. 2C, the help content 270 in associated with the component will be directly displayed on the transparent layer 240, beside the target component, and over the original UI. The help content 270 on the transparent layer 240 may be implemented in a scrollable fashion in case the help contents extend more than one page. After the user exits from the help mode, the transparent layer withdraws and the user is back to the original UI. The program module of performing the help mode to provide a help feature will be described in detail with reference to FIG. 3.

As mentioned above, the storage device 120 in the mobile device 100 may store the program codes to be executed by the processor 110 for providing the functions of the mobile device 100. Thus, the program codes included in the program module of performing the help mode according to the preferred embodiment of the present invention will be stored in the storage device 120 to be executed by the mobile device 100.

Figure 3:
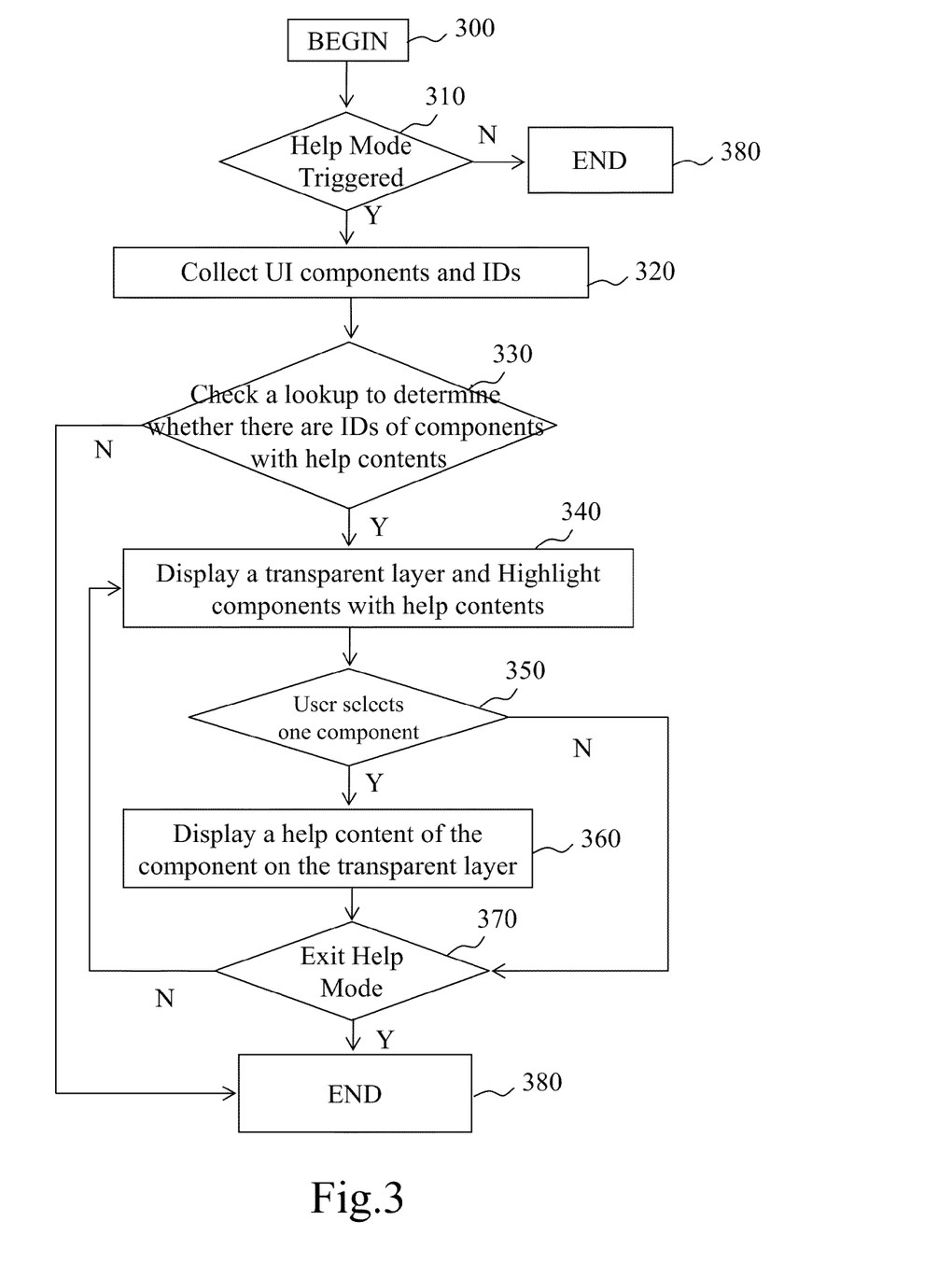
FIG. 3 is a flowchart of a program module of performing the help mode in accordance with one embodiment of the disclosure.

FIG. 3 is a flowchart of a program module of performing the help mode in accordance with one embodiment of the disclosure. The flowchart 300 begins in step 310, where a user determines whether to trigger a help mode. In step 320, when the help mode is triggered, the program module collects components currently shown on an original display interface (or called original UI) of a running application and identifications (IDs) representing the components. For example, this step can be performed by using APIs provided by a window manager of UNIX to collect the components currently shown on a display interface of a running application and identifications (IDs) representing the components. In next step 330, the program module checks a lookup table which is stored in advance to determine whether there are identifications (IDs) of components with help contents associated. The lookup table is stored into the storage device 120 in advance, and basically comprises identifications of components and the messages of whether there are help contents associated to the components. The associated help contents are also stored into the storage device 120. In other embodiments, the associated help contents may be stored in external websites, and retrieve them from the website depending on requirement.

In an embodiment according to the present invention, the component herein means an element shown in the layout on the display interface or user interface (UI). The component is also called a "Widget" in the field of programming of graphic user interface (GUI). In fact, the present invention can be applied to any objects with a unique identification, for example, any words, terms, sentences or paragraphs shown in a webpage, which require further explanations.

Next, a transparent layer will be displayed over the original display interface, and all the UI components with help contents associated will be dynamically highlighted on the transparent layer 240 to prompt the user to select a target component for usage explanation or further description (step 340). The technique of displaying (or creating) a transparent layer or a Widget is widely supported on various platforms. In general, it's done by setting the value of the component's transparency (more exactly, "alpha" value). For example, the setting of:

innerPaint.setARGB (225, 75, 75, 75) for Android with an alpha value (225 is the alpha value), or [topHoverView setAlpha:0.2]

for iPhone with an alpha value. The detailed descriptions can be obtained from the following URL addresses:

1. http://blog.pocketjourney.com/2008/03/15/tutorial-1-transparent-panel-linear-layout-on-mapview-google-map/
2. http://stackoverflow.com/questions/1409285/iphone-sdk-non-transparent-subviews-in-transparent-view Besides, for web-pages design, JavaScript™ library also provides a feature of setting the value of the component's transparency, such as:

filter:alpha(opacity=80).

Once a component is selected by the user, the help contents will be displayed directly on the transparent layer, beside the target component, and over the original UI (step 360). As mentioned above, the program module of performing the help mode may trigger the context-aware help feature on the mobile device and enter a help mode by using voice-over commands or any other mechanisms (e.g. clicking a specific key). Similarly, the program module may exit from the help mode by using voice-over commands or any other mechanisms (e.g. clicking another specific key, or re-clicking the specific key, even double-clicking the specific etc.)

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
after a help mode is triggered and before a transparent layer is displayed, collecting objects shown on a display interface for a running application and identifications (IDs) representing the objects, wherein a state of the display interface at the time of the collecting does not show a help indicia next to all of the objects for which help contents are available;
for each of the objects for which identifications were collected and before the transparent layer is displayed, determining whether there are object identifications of the objects with help contents associated; and
without modifying a positioning of element in the display interface from that of the state, displaying the transparent layer over the display interface and visually indicating in the transparent layer all the objects with help contents associated to prompt a user to select a desired object, wherein at a time that the visual indicating occurs via the transparent layer, the help contents are not displayed in either the transparent layer or the display interface, wherein displayed transparent layer is configured to receive and handle events associated with the objects in the underlying layer of display interface;
receiving a user selection of one of the objects that is visually indicated as having help contents associated, responsive to the receiving, displaying help contents associated with the one of the objects, wherein displaying the help contents causes the help indicator to no longer be presented.

2. The method according to claim 1, wherein said step of determining further comprises: checking a lookup table which is stored in advance to determine whether there are identifications (IDs) of objects with help contents associated.

3. The method according to claim 1, further comprising: once an object is selected, directly displaying a help content of the object on the transparent layer, beside the target object.

4. The method according to claim 1, wherein the visual indicating in the transparent layer is performed by highlighting.

5. The method according to claim 4, wherein the highlighting refers to altering a background coloration of the objects with help contents.

6. The method according to claim 3, wherein the objects are UI components on a layout of the display interface.

7. The method according to claim 3, wherein the object is one of a set of words, terms, sentences or paragraphs which require further explanations.

8. A computer program product comprising a non-transitory computer readable storage medium having computer usable program code embodied therewith, the computer usable program code comprising:
computer usable program code configured to after a help mode is triggered and before a transparent layer is displayed, collect objects shown on a display interface for a running application and identifications (IDs) representing the objects, wherein a state of the display interface at the time of the collecting does not show a help indicia next to all of the objects for which help contents are available;

computer usable program code configured to determine, for each of the objects for which identifications were collected and before a transparent layer is displayed, whether there are object identifications of the objects with help contents associated;

computer usable program code configured to without modifying a positioning of element in the display interface from that of the state, display the transparent layer over the display interface and visually indicating in the transparent layer all the objects with help contents associated to prompt a user to select a desired object, wherein displayed transparent layer is configured to receive and handle events associated with the objects in the underlying layer of display interface and wherein at a time that the visual indicating occurs via the transparent layer, the help contents are not displayed in either the transparent layer or the display interface; and computer usable program code configured to receive a user selection of one of the objects that is visually indicated as having help contents associated, responsive to the receiving, displaying help contents associated with the one of the objects, wherein displaying the help contents causes the help indicator to no longer be presented.

9. The computer program product according to claim 8, further comprising:
computer usable program code configured to check a lookup table which is stored in advance to determine whether there are identifications (IDs) of objects with help contents associated.

10. The computer program product according to claim 8, further comprising:
computer usable program code configured to, once an object is selected, directly display a help content of the object on the transparent layer, beside the target object.

11. The computer program product according to claim 10, wherein the visual indicating in the transparent layer is performed by highlighting.

12. The computer program product according to claim 9, wherein the help content is retrieved from external websites.

13. The computer program product according to claim 10, wherein the objects are UI components on a layout of the display interface.

14. The computer program product according to claim 10, wherein the object is one of a set of words, terms, sentences or paragraphs which require further explanations.

15. A data processing system comprising:
a bus;
a memory connected to said bus, in which said memory comprises a set of instructions; and a processor connected to said bus, in which said processor executes said set of instructions to:
after a help mode is triggered and before a transparent layer is displayed, collect objects shown on a display interface for a running application and identifications (IDs) representing the objects, wherein a state of the display interface at the time of the collecting does not show a help indicia next to all of the objects for which help contents are available;
for each of the objects for which identifications were collected and before the transparent layer is displayed, determine whether there are object identifications of objects with help contents associated;
without modifying a positioning of element in the display interface from that of the state, display a transparent layer over the display interface and visually indicating in the transparent layer all the objects with help contents associated to prompt a user to select a desired object, wherein at a time that the visual indicating occurs via the transparent layer, the help contents are not displayed in either the transparent layer or the display interface, wherein displayed transparent layer is configured to receive and handle events associated with the objects in the underlying layer of display interface; and
receive a user selection of one of the objects that is visually indicated as having help contents associated, responsive to the receiving, displaying help contents associated with the one of the objects, wherein displaying the help contents causes the help indicator to no longer be presented.

16. The data processing system according to claim 15, in which said processor executes said set of instructions to: check a lookup table which is stored in advance to determine whether there are identifications (IDs) of objects with help contents associated.

17. The data processing system according to claim 15, in which said processor executes said set of instructions to: once an object is selected, directly display a help content of the object on the transparent layer, beside the target object.

18. The data processing system according to claim 17, wherein the visual indicating in the transparent layer is performed by highlighting.

19. The data processing system according to claim 16, wherein the help content is retrieved from external websites.

20. The data processing system according to claim 17, wherein the objects are UI components on a layout of the display interface.

21. The data processing system according to claim 17, wherein the object is one of a set of words, terms, sentences or paragraphs which require further explanations.

22. The data processing system according to claim 15, wherein the data processing system is a handheld, mobile device.

23. A method comprising:
before a help mode is triggered, presenting a plurality of graphical objects on a touch-sensitive screen, wherein a state of the tough-sensitive screen at the time of the presenting of the graphical objects does not show a help indicia next to all of the graphical objects for which help contents are available;
after the help mode is triggered and in response to the help mode being triggered, presenting a graphical overlay on the touch-sensitive screen, having a level of transparency that permits the graphical objects to be seen, wherein the graphical overlay presents a help indictor proximate to the graphical objects for which help content is available and does not present a help indicator proximate to graphical objects to which help content is not available, wherein when the graphical overlay is active, the graphical objects in underlying display interface are not able to receive any events, wherein the presenting of the graphical overlay occurs without modifying a positioning of graphical objects from that of the state;
receiving a touch input on the touch-sensitive screen for one of the help indicators and a corresponding one of the graphical objects still visible through the graphical overlay;
responsive to the touch input, determining help content for the one of the graphical objects; and presenting the help content on the graphical overlay on the touch-sensitive screen in responsive to receiving the touch input, wherein the presenting the help content causes the help indicator to no longer be presented, and wherein the presenting of the help content at least partially obscures the underlying graphical objects, wherein the help content is not concurrently displayed with the help indicator, wherein the graphical overlay is presented responsive to an activation of a help function, wherein in absence of the help indicators being presented on the graphical overlay, no visual indication exists to indicate that selective ones of the graphical objects have help content associated with them and other ones of the graphical objects do not have help content associated with them.

24. The method of claim 23, wherein each of the graphical objects are objects for a running application, which is instantiated and displayed on the touch-sensitive screen, wherein each of the objects has a corresponding identification unique to that object and the running application;

determining at runtime, responsive to a selection of a help function, whether each of the objects has help contents associated with that object, wherein the graphical overlay is a transparent layer on the touch-sensitive screen upon which a display interface is presented; and highlighting all the objects with help associated on the transparent layer to prompt a user to select a desired object, wherein the highlighting is the help indicator, wherein the highlighting refers to altering a background coloration of the objects with help contents.

\* \* \* \* \*